May 1, 1956 G. BREIT 2,744,235
MAGNETIC FIELD EXTRAPOLATING APPARATUS AND METHOD
Filed Feb. 4, 1946 10 Sheets-Sheet 1
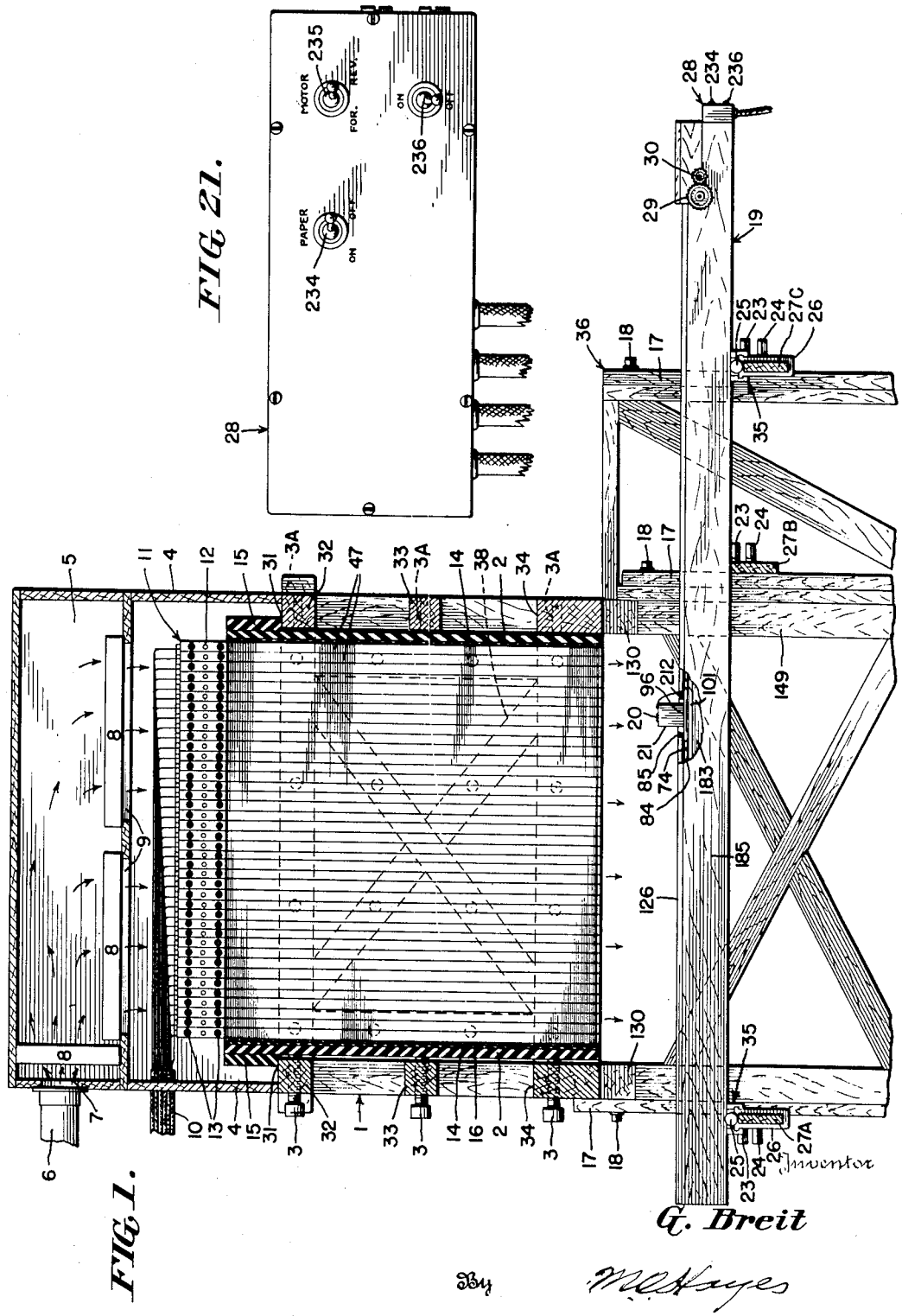

May 1, 1956 — G. BREIT — 2,744,235
MAGNETIC FIELD EXTRAPOLATING APPARATUS AND METHOD
Filed Feb. 4, 1946 — 10 Sheets-Sheet 2
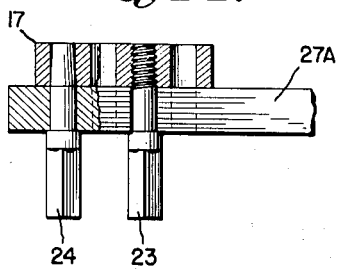
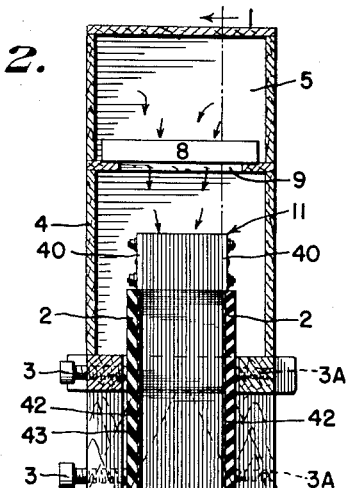
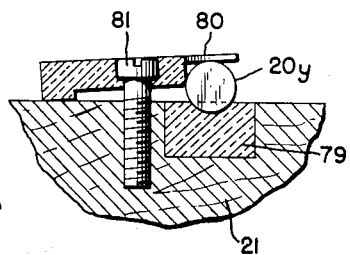
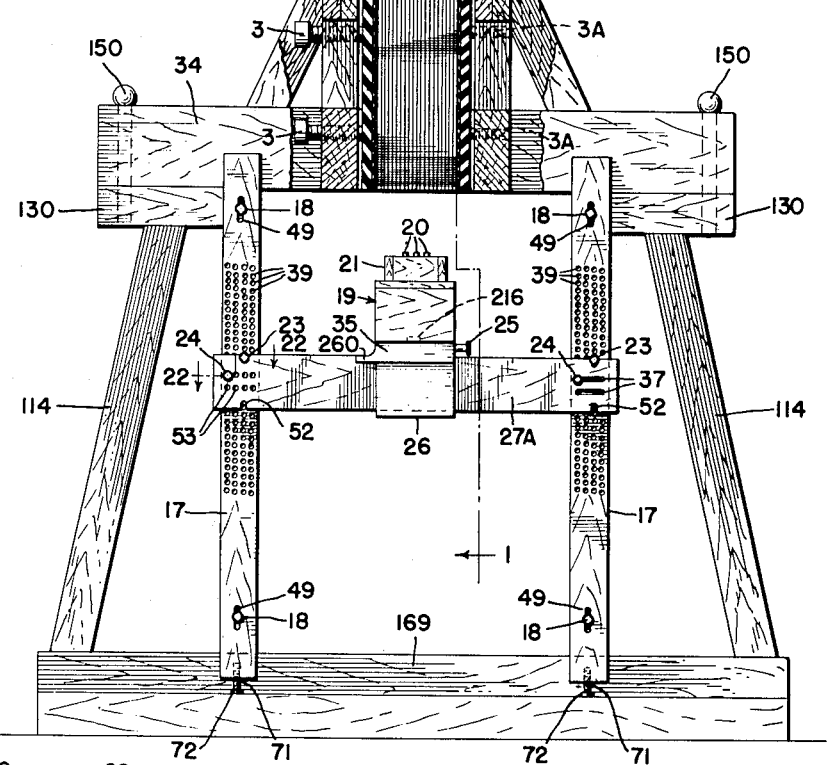
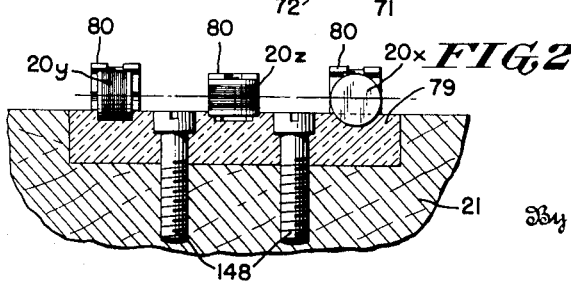
Inventor
G. Breit
Attorney May 1, 1956 G. BREIT 2,744,235
MAGNETIC FIELD EXTRAPOLATING APPARATUS AND METHOD
Filed Feb. 4, 1946 10 Sheets-Sheet 3
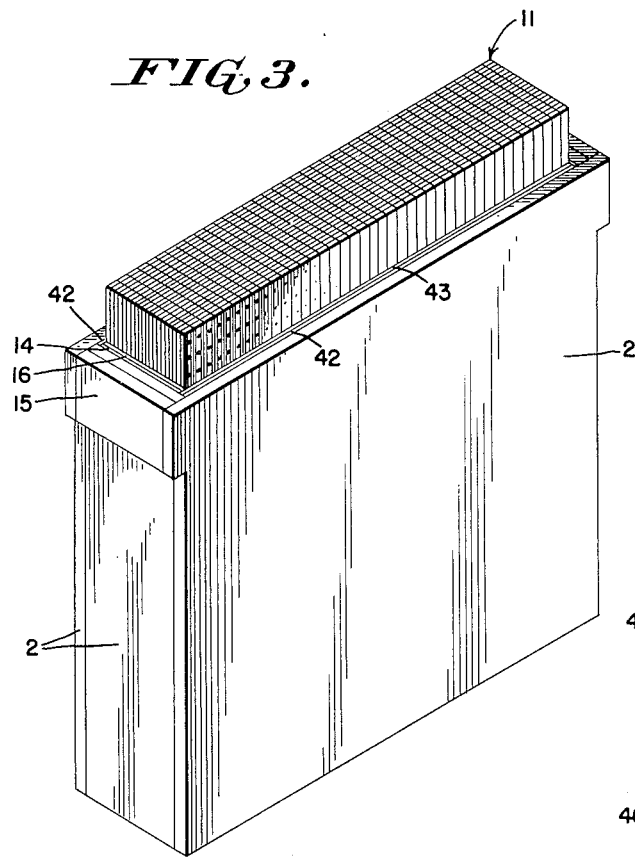
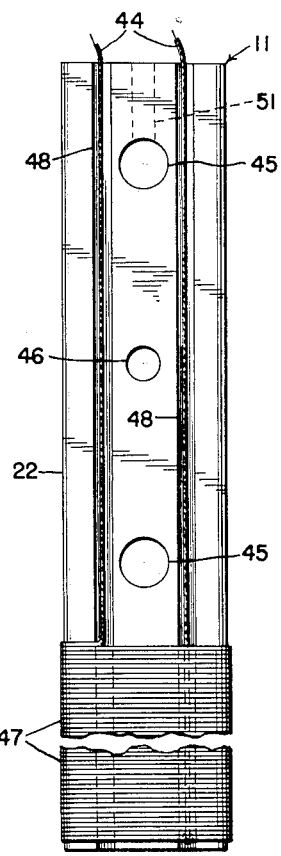
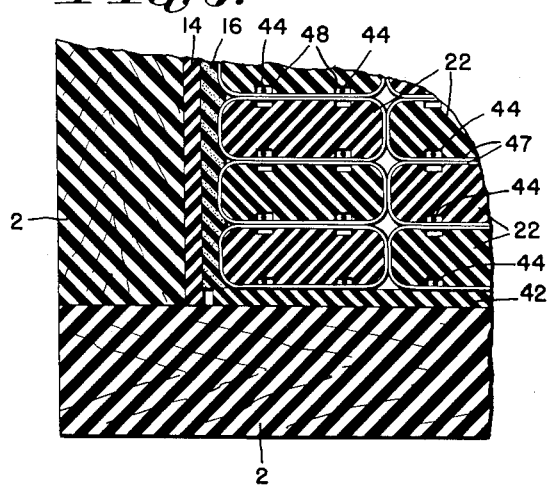
Inventor
G. Breit Inventor
G. Breit

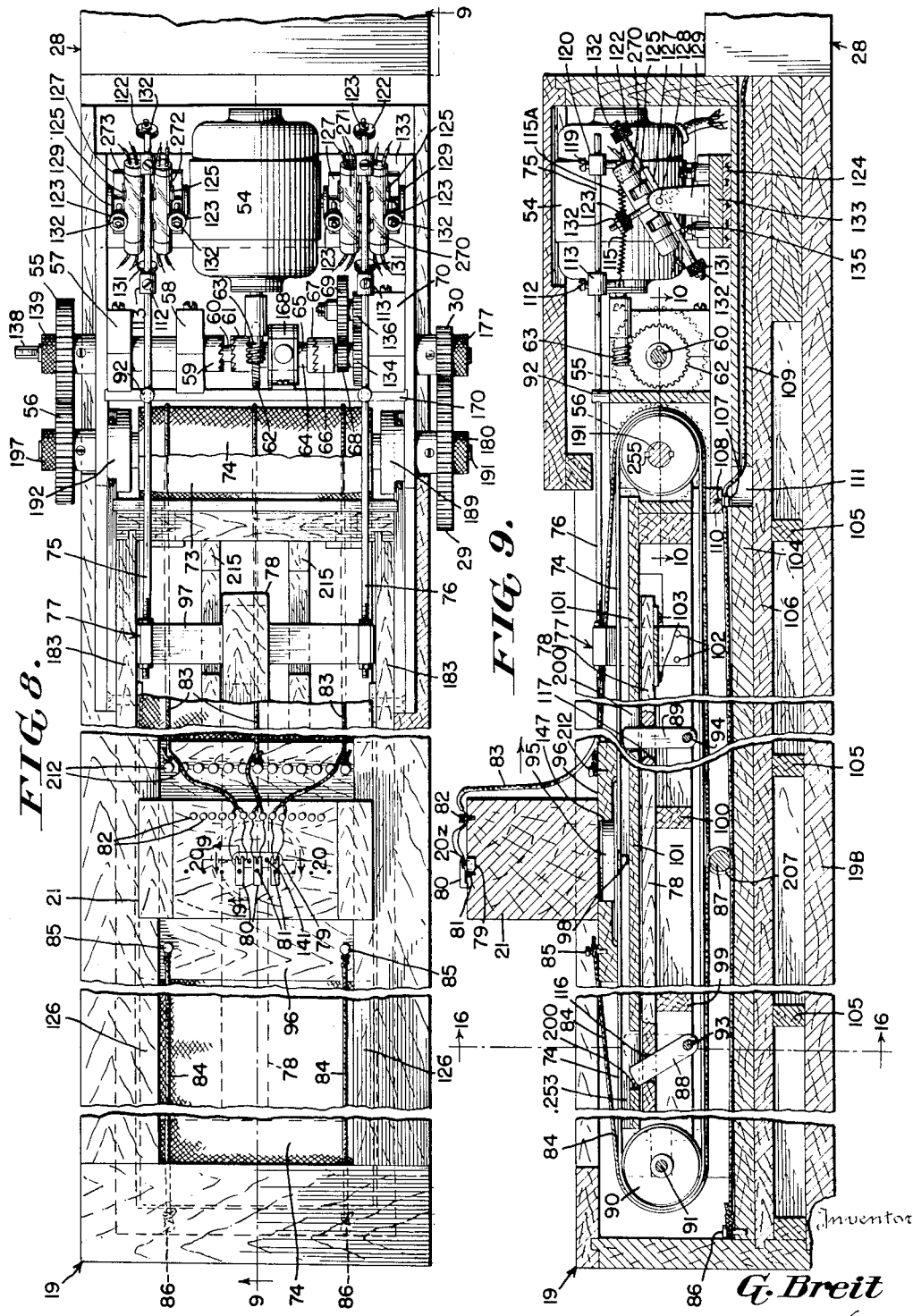

May 1, 1956  G. BREIT  2,744,235
MAGNETIC FIELD EXTRAPOLATING APPARATUS AND METHOD
Filed Feb. 4, 1946  10 Sheets-Sheet 6

Inventor
G. Breit
By
M. C. Hayes
Attorney

May 1, 1956 G. BREIT 2,744,235
MAGNETIC FIELD EXTRAPOLATING APPARATUS AND METHOD
Filed Feb. 4, 1946 10 Sheets-Sheet 7
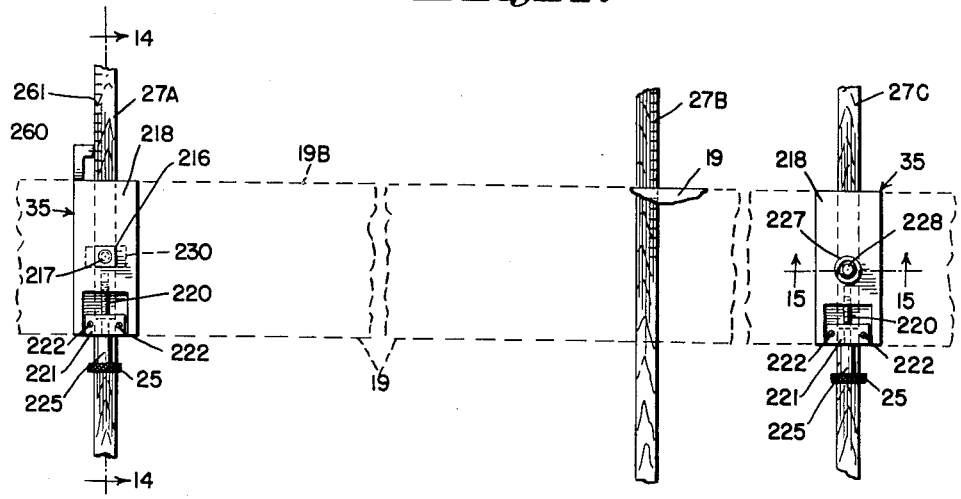
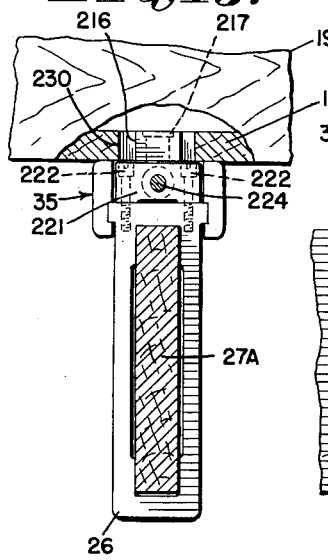
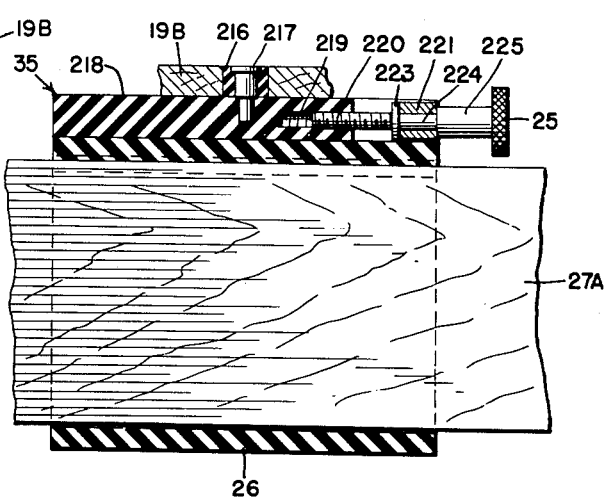
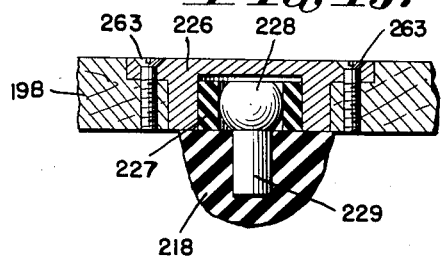
Inventor
G. Breit
By M. O. Hayes
Attorney

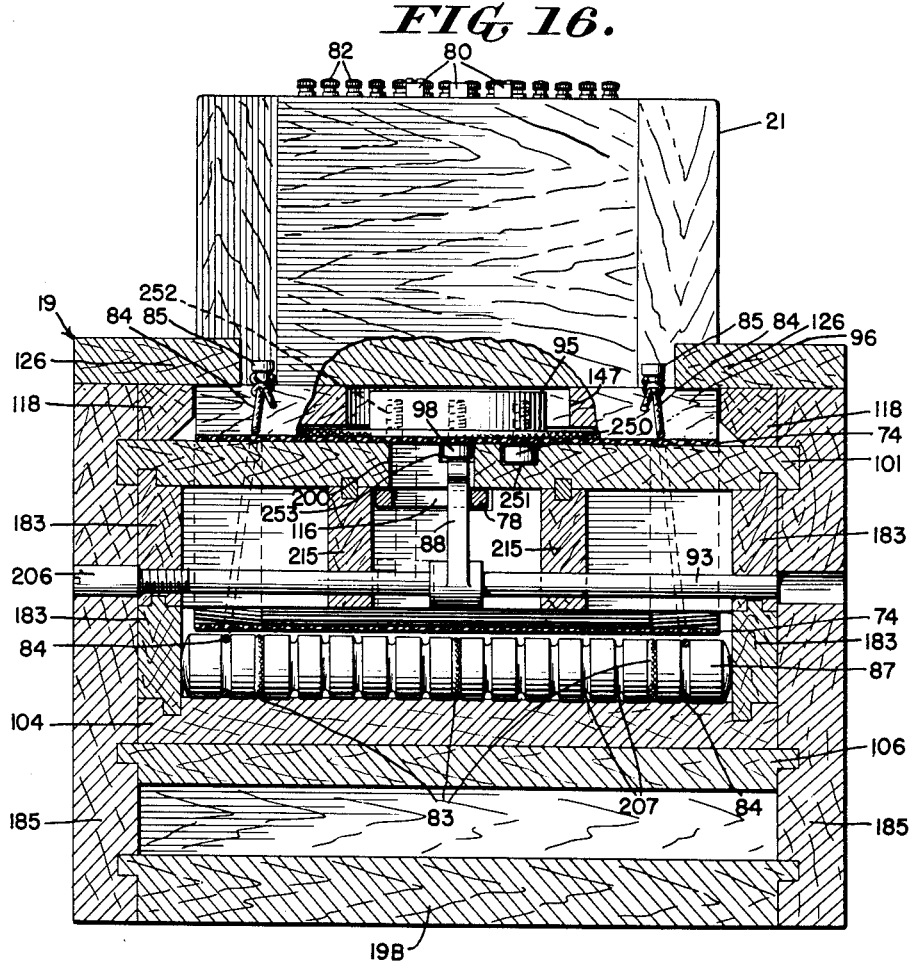
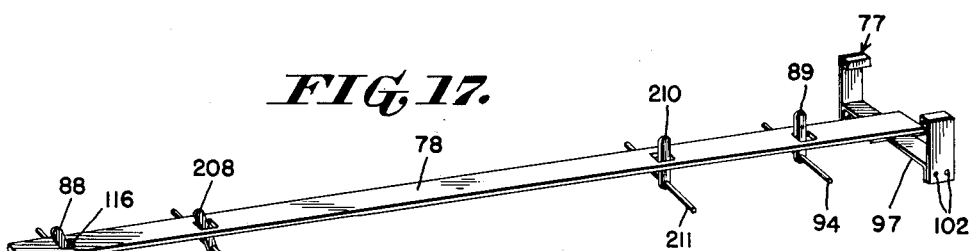
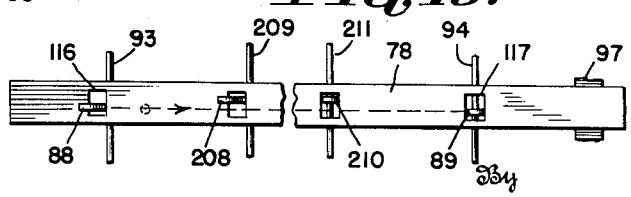

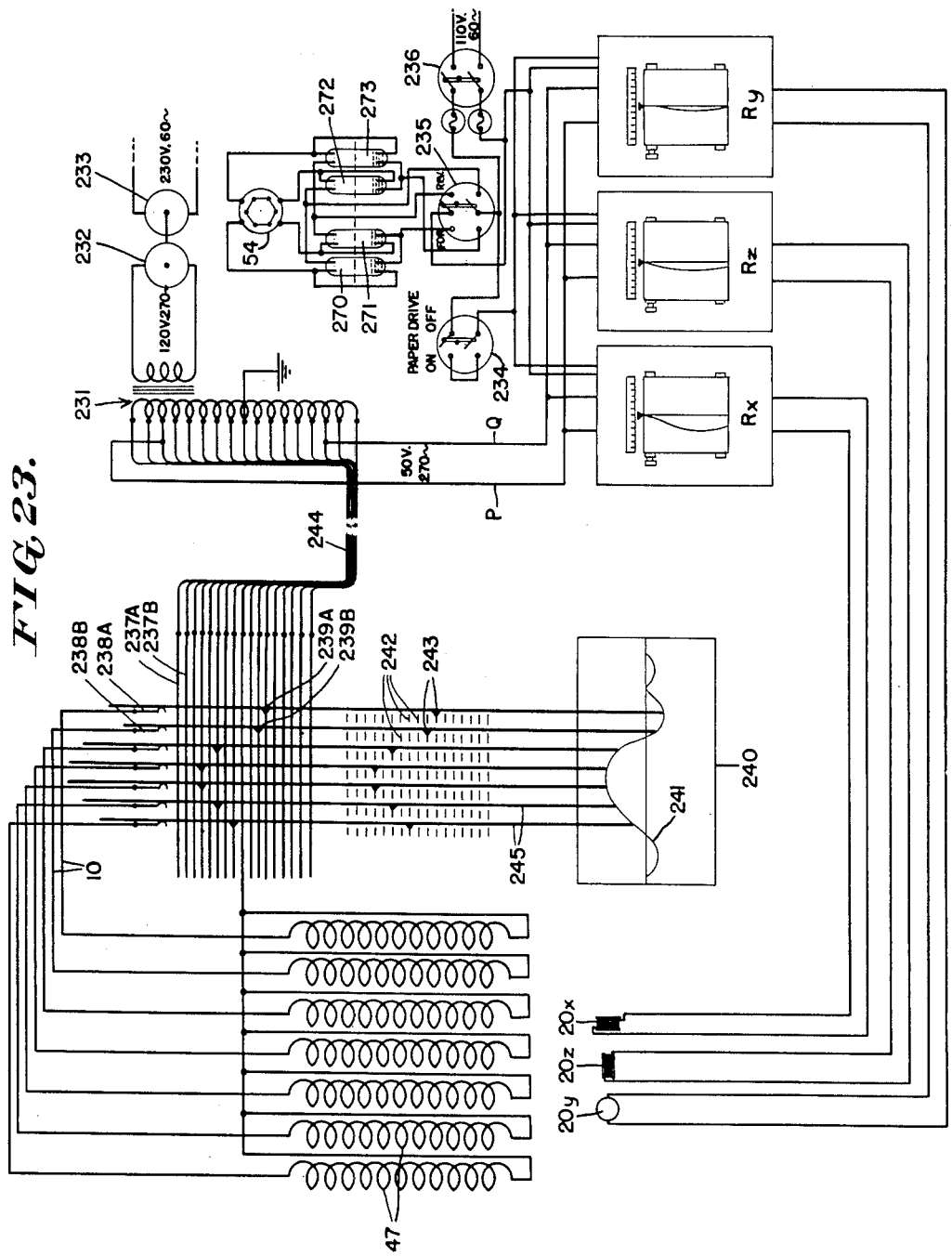

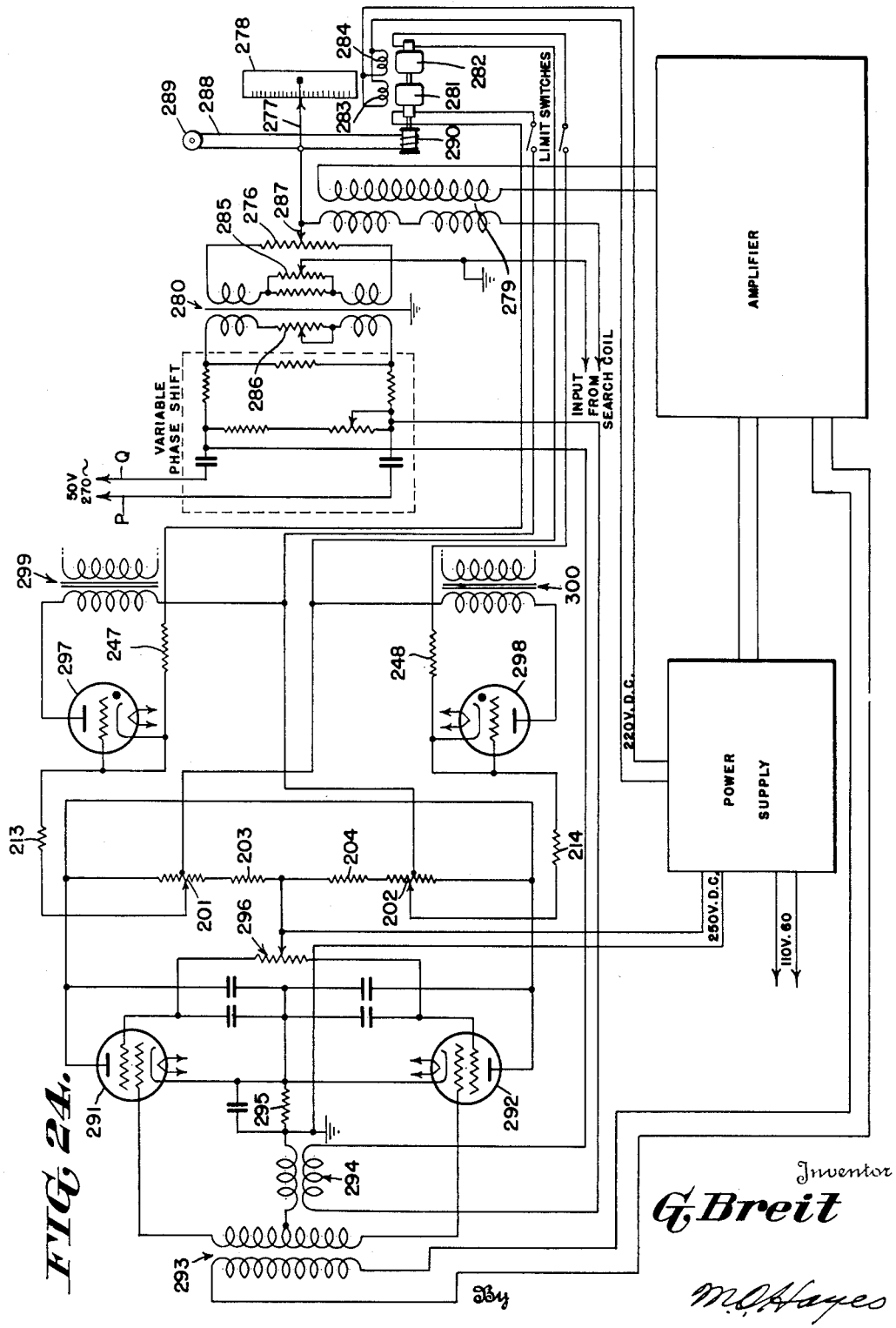

United States Patent Office 2,744,235
Patented May 1, 1956

2,744,235

MAGNETIC FIELD EXTRAPOLATING APPARATUS AND METHOD

Gregory Breit, Madison, Wis.

Application February 4, 1946, Serial No. 645,428

24 Claims. (Cl. 324—43)

(Granted under Title 35, U. S. Code (1952), sec. 266)

This invention relates to means for obtaining graphs or charts of the magnetic field of a vessel by employing a generated electro-magnetic field simulating the magnetic field of the vessel, such graphs being referred to hereinafter as magnetic signatures of the vessel.

More specifically, the invention contemplates an arrangement in which a large number of substantially identical solenoids or electro-magnets are arrayed in parallel rows with their axes parallel, and in which the electro-magnets are energized according to a predetermined pattern to produce an electro-magnetic field having substantially the same predetermined sign and proportional amplitude as the field of a vessel measured in a horizontal plane beneath it. The magnetic signatures represent values of the simulated field as measured along predetermined lines therein and are developed by traversing the simulated field with a coil disposed in definite axial relationship to the solenoids and connected to a recording device adapted to produce a trace indicative of the strength of at least one of the components of the simulated field, the recorded results being substantially those which would have been obtained had direct measurements been made from the vessel in a horizontal line parallel to the keel and below the plane of measurement thereof.

It has been the general practice to measure the magnetic field of a ship by arranging coils of wire at uniformly spaced intervals upon the level bed of a shallow body of water. These coils are usually spaced at distances of 20 feet between adjacent coils in a horizontal line extending athwartship, and have their axes disposed so that the voltages induced therein are proportional to the vertical component of the ship's field. As the ship is moved over the coils, the total vertical component of the ship's magnetic flux encircled by a given coil changes in magnitude and may change in sign. These changes induce currents in the coils, which currents are recorded automatically upon charts individual to the coils. The charts are in the form of curves showing the variation of the vertical component of the magnetic field of the ship at a depth equal to the depth of submersion of the coils and along lines in the fore and aft direction which may be either directly under the keel or to port or starboard thereof, depending on the athwartship location of the coils responsible for the curves corresponding thereto.

A curve, such as those of the aforedescribed type, showing the variation of the ship's magnetic field along some straight line parallel to the keel is called the ship's magnetic signature. Whereas signatures may be taken of other than the vertical components of the field, and whereas three pick-up coils are shown and described hereinafter for measuring all three components as the simulated field is traversed by the coils, in the subject specification the term signature, unless qualified, is used with reference to the vertical component of the field.

Heretofore, when it was desired to determine magnetic signatures of a vessel at greater depths than could be obtained by the above described method, it was necessary to resort to one of two procedures, both slow, tedious, and difficult. The first of these methods involves computation. It can be shown mathematically that if the distribution of the vertical component of the magnetic field intensity of a ship is completely known all over a horizontal plane at any particular depth below the keel, the field of the ship anywhere below this plane may be uniquely determined and can be computed mathematically. The second method involves the construction from magnetic material of a model of the vessel having a magnetic field possessing in reduced scale the character of that of the vessel, and then measuring the field of the model, the measurements being made in the model field at distances corresponding to depths greater than the depth of measurements of the vessel's field.

In the system of the present invention, a field which simulates the magnetic field of the ship as obtained by direct measurements in a predetermined horizontal plane below the keel thereof is set up by alternating currents flowing in the abovementioned assembly or array of closely disposed electromagnets. At any given instant of time (other than the instant when the alternating field is passing through zero), the entire simulated field will be a magnetic field whose intensity at any particular point is proportional in magnitude and corresponding in algebraic sign to the field intensity of the ship at the corresponding point within or below the measured plane. The geometric scale of the simulated field will be smaller than that of the measured field, and the absolute intensities at corresponding points in the measured and simulating fields need not be equal. There are two entirely arbitrary and unrelated constants of proportionality between the simulated field and the measured field, one for magnetic intensities and the other for geometric dimensions. The use of alternating instead of steady magnetic fields does not vitiate the similitude between the measured and simulated fields since the instantaneous value of the simulated field always maintains exact proportionality at every point therein with the steady intensity at the corresponding point of the directly measured or ship's field.

A coil moved at uniform speed and in a predetermined direction within the simulated field has a voltage induced therein proportional to one of the $H_x$, $H_y$, or $H_z$ components of the field, depending upon the orientation of the coil with respect to the field, as will appear more fully hereinafter. The magnitude and sign of the induced voltage are recorded by suitable recording apparatus.

One of the objects of the present invention is to provide new and improved means for setting up an electromagnetic field whose intensity at any particular point is controlled at will and may be varied in both magnitude and sign.

Another object is to provide new and improved means for simulating the field of a vessel as measured in a predetermined horizontal plane beneath the keel thereof.

Another object is the provision of means for traversing a magnetic field of predetermined patern simulating the field of a vessel with a pick-up coil at uniform speed and in various predetermined directions or paths.

A further object is to provide new and improved semi-automatic means for reversing the direction of movement of the pick-up coil when it has traveled the desired distance.

Still a further object is to provide circuit means having a resistance substantially unchanged by movement of the coil for electrically connecting the pick-up coil to the recording apparatus.

Another object is to provide means whereby a number of charts of magnetic signatures may be used in cooperation with a plurality of switching means physically adjustable with respect to the charts to determine the degree of energization of a number of solenoids employed to generate an electro-magnetic field simulating the field of a vessel.

An additional object is to provide a method for obtaining magnetic signatures by generating an electro-magnetic field simulating the measured field of a vessel in a given plane below the keel and then measuring the field thus generated along predetermined lines in different planes therein to obtain signatures representative of the signatures which would be obtained from direct measurements of the vessel at corresponding planes below the plane of measurement.

Still other objects, advtantages and improvements will be apparent from the following description of the invention taken in connection with the accompanying drawings of which:

Fig. 1 is a view in elevation, partially sectional and partially broken away, of the framework which supports the electromagnets or solenoids, and the runway box for the carriage which supports the pick-up coils as viewed substantially along the line 1—1 of Fig. 2;

Fig. 2 is an end elevational view partially broken away, of the supporting framework, showing the solenoids and clamping means associated therewith;

Fig. 3 is a view in perspective of solenoids and the housing therefor;

Fig. 4 is an enlarged view in elevation of one of the solenoids shown in Fig. 3 and illustrates the end portions thereof;

Fig. 5 is a sectional view taken in a horizontal plane through a portion of the housing, and shows the arrangement of the electro-magnets therein;

Fig. 8 is a plan view partially broken away of the runway for the carriage supporting the pick-up coils, showing the belt and belt driving mechanism;

Fig. 9 is a sectional view taken along the line 9—9 of Fig. 8 and illustrating the runway, carriage, belt, belt driving mechanism, driving motor and associated apparatus;

Fig. 12 is a plan view of the two carriages which support the runway box in the main framework;

Fig. 13 is an end elevation in partial section of the left hand carriage of Fig. 12;

Fig. 14 is a somewhat enlarged sectional view of the left hand carriage as taken along line 14—14 of Fig. 12;

Fig. 15 is an enlarged detailed sectional view of the bearing for the bottom of the runway box which is fixed on the right hand carriage of Fig. 12 as seen along the line 15—15 thereof;

Fig. 16 is an enlarged sectional view of the main housing or runway box and coil carriage of Fig. 9 as viewed substantially along the line 16—16 thereof and partially broken away to show certain details of construction;

Fig. 17 is a view in perspective of a coupling yoke which operates push rods for controlling the motor reversing mechanism, and the attached push bar and rocking arm;

Fig. 18 is a fragmentary plan view of the push bar showing how the rocking arms may be displaced laterally to render them operative or unoperative at will;

Fig. 19 is an enlarged sectional view taken along the line 19—19 of Fig. 8 and illustrating the manner in which the pick-up coils are clamped to their carriage;

Fig. 20 is an enlarged sectional view taken along the line 20—20 of Fig. 8 and illustrating the pick-up coils attached to the carriage;

Fig. 21 is an enlarged front view of the operator's control box, shown located on the right-hand end of the runway box of Fig. 1;

Fig. 22 is an enlarged sectional view taken along the line 22—22 of Fig. 2 and illustrating the means by which the cross bar which supports the runway box is fixed at variable heights upon the uprights;

Fig. 23 illustrates schematically an electrical circuit arrangement suitable for use with the invention; and Fig. 24 illustrates schematically suitable recording apparatus for use with the present invention.

Figure 6:
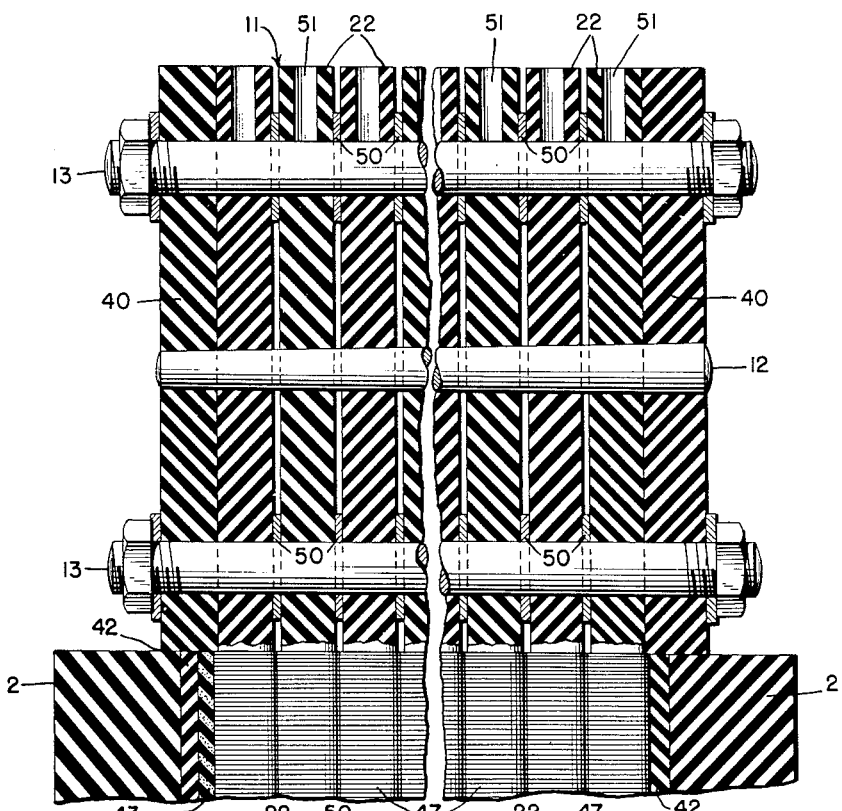
Fig. 6 is an enlarged sectional view taken along the line 6—6 of Fig. 7 and illustrating the manner in which the solenoid cores are clamped together.
Figure 7:
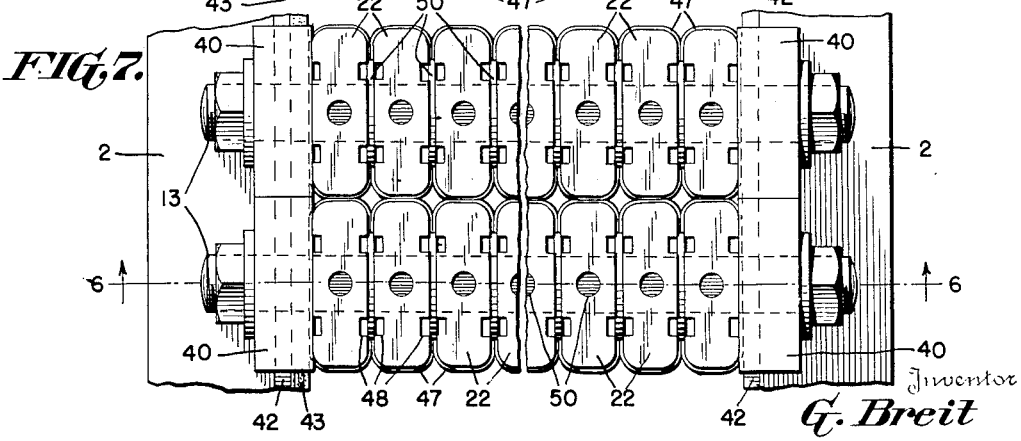
Fig. 7 is a plan view of a fractional portion of the solenoid assembly illustrating the solenoids as they appear when clamped.

Referring now to the drawings on which like numerals of reference are employed to designate like parts throughout the several views, and more particularly to Fig. 1 thereof, there is shown a framework indicated generally by the numeral 1, which supports the group of electromagnets designated generally by the numeral 11 above a long box-like structure 19, spoken of generally herein as the runway box, which houses an exploring mechanism consisting of search coils 20 and coil carriage 21, and apparatus for moving the coil carriage in the desired manner. As will be described subsequently, the box or runway 19 is adapted to be moved transversely and precisely located under the solenoids, and is also adapted to be precisely positioned vertically, so that a predetermined geometrical relationship may be maintained at all times between the lines of movement of the search coils and the electro-magnets.

The electro-magnets or solenoids, 800 in number in the present preferred embodiment of the invention, are shown in detail in Fig. 4, to which reference is made. A long rectangular core 22 made of hard rubber or other suitable material supports a coil winding 47. The windings are purposively made long and narrow to prevent the pole at the upper end from influencing greatly the field near the lower end, and in the present embodiment are approximately 48 inches long. The windings are preferably of high resistance wire to keep the ratio of reactance to resistance very low so that the phase displacement between current and applied voltage in the windings will be low, for reasons which will be apparent later. Running longitudinally of the core on each side are two ducts or grooves 48, one pair of which serve to house lead wires 44, and other two affording ventilation. Holes 45 are provided for bolting a group of solenoids together to form a file, and hole 46 permits the use of a taper or dowel pin for precise positioning of the solenoid assembly. The hole 51 is provided for mounting soldering lugs if desired. In the present embodiment, the solenoids are arranged in 20 rows of 40 solenoids each. Each file will therefore contain 20 solenoids.

Referring now to Figs. 3, 5, 6 and 7 it will be seen that the solenoids are held in position by bolts 13 having nuts screwed thereon, spacer washers 50, and by dowel pin 12. At each end of the file are clamped blocks 40 of hard rubber or other suitable material which provide vertical support for the solenoids by resting upon the shoulders of a large nonmagnetic electrically nonconducting box which serves as a solenoid housing, two sides of which are shown at 2. Disposed inside the inner surface on each side of the solenoid housing is a sheet of hard rubber or similar material designated on the long sides at 42 and on the short sides at 14, and disposed internally of these on two adjacent sides of the box are sheets of sponge rubber, the sheet on the short side being shown at 16, the long side at 43. The pieces 15 on each end of the housing, Fig. 3, form lips which support the housing in a vertical direction by resting on shoulders in the main framework.

Referring again to Fig. 1, the pieces 15 are seen resting upon the shoulders 31 of cross beams 32. Additional cross beams 33 and 34 and cross braces 38 give added support. The solenoid housing is clamped in place by adjustable wooden screws 3 and 3A in threaded holes in the beams.

It is preferable, in order to avoid distorting the fields of the solenoids, to use as little magnetizable material in the apparatus as possible. For this reason, the present preferred embodiment uses wood, hard rubber, or other suitable nonmagnetic material extensively wherever metal is not absolutely necessary.

It is preferable, in order to maintain the electrical and physical constants of the apparatus, to provide means for ventilating the solenoids. To accomplish this, a ventilating box or manifold made of wood or other suitable material fits snugly over the top of the solenoids, the sides being shown at 4 in Fig. 1. Air enters the upper chamber or portion 5 through duct 6 and orifice 7, where it is cleaned by filters 8 and passes through openings 9 into the area above the solenoids and thence down through the two aforementioned longitudinal ventilating ducts in each solenoid. Solenoid connecting cables 10 enter through the wall as shown.

Positioned beneath the solenoids is the box-like structure 19 housing the pick-up coils and searching apparatus. It is supported vertically by three cross beams 27A, 27B, and 27C, which are movably attached to vertical posts 17 in a manner to be subsequently described. An outboard structure designated generally at 36 provides additional support for the box 19. Whereas the box rests directly upon the horizontal bar support 27B and is adapted to move slideably therealong supports 27A and 27C are provided with carriages of nonmagnetic electrically nonconducting or other suitable material designated generally by the numeral 35, which may be moved laterally and precisely positioned.

Referring more particularly to Fig. 14 which shows a sectional view of one of the carriages, nonmagnetic electrically nonconducting supporting yoke 26 is arranged to slide freely upon the horizontal bar support 27A. Fixedly secured to one end of this yoke is a bearing or journal 221 for a thumb screw 25 having a shaft portion 224 and a threaded portion 220. Axial movement of the thumb screw in the bearing 221 is prevented by the fixed flange 223 and the hub portion 225. The threaded portion 220 engages the threads in a threaded hole 219 in an upper bearing portion, positionable as desired with relation to the yoke by adjustment of the screw 25. A pin 217 fixedly secured to member 218 has associated therewith a swivelling square nonmagnetic electrically nonconducting head 216 which cooperates with an elongated slot 239 in the bottom of the exploring device runway box, the bottom being designated by the reference character 19B.

Referring now to Fig. 13 which shows the bracket or carriage in side elevation, screws 222 fixedly secure the bearing 221 to the yoke 26. Referring now to Fig. 12, the left-hand carriage is the carriage of Figs. 13 and 14 in a plan view. An indexing member or pointer 260 is shown attached to the carriage in cooperative proximity to a scale 261 on the horizontal bar support. The right-hand carriage of Fig. 12 differs from the other in that it bears no pointer. The manner of securing the base 19B of the runway box to the right-hand carriage is also different, and is shown in section in Fig. 15, a pivot bearing being employed for this purpose. The ball pin 229 fixed in the member 28 has a floating cylindrical socket 227 which is engaged by a nonmagnetic electrically nonconducting bearing 226 fixed by screws 263 in the bottom of the box 19B.

Referring now to Fig. 2 it will be seen that framework 1 may comprise on either end thereof outer diagonal uprights or posts 114 and vertical posts 149 disposed directly behind uprights 17. Adjacent diagonal and vertical posts 114 and 149 are secured at the bottom ends thereof to a base 169 and at their top ends to relatively short horizontal members 130. Each of the supporting cross beams 34 of the solenoid housing extends considerably beyond the housing and rests upon the members 130 subjacent thereto. Beams 34 are removably secured to their respective supports 130 by suitable pins 150.

The uprights or stanchions 17 are shown adjustably attached to vertical posts 149 of the main framework 1 by bolts 18 of nonmagnetic electrically nonconducting or other suitable material passing through grooves 49 therein, the bolts being in engagement with threaded holes in the aforementioned vertical supporting posts 149. In addition, there are provided threaded studs 71 of brass or other suitable material fixed in the ends of the uprights and extending into bores in the frame base, and having nuts 72 thereon for vertical positioning of the uprights.

For reasons which will be apparent later, it is desirable to be able to position the cross support 27A in vertical decrements corresponding to the width of one solenoid coil, or fractional portions theref. To accomplish this, four parallel vertical rows of holes 39 are provided in each stanchion 17, the vertical distance between the centers of adjacent holes being two coil widths. The transverse rows all slant as shown, the vertical distance between the centers of adjacent holes in the transverse rows being one-half coil width; that is, the centers of holes of the second vertical row from the left are all one-half coil width below the adjacent centers of the left-hand row; the centers of the third vertical row are one coil width below the left hand row, and those of the fourth or right hand vertical row are one and one-half coil width below the corresponding hole in the left hand row.

Disposed on the left hand end of horizontal cross supporting piece 27A are horizontally extending rows of holes 53, the vertical distance between hole centers being three coil widths. The holes in the uprights and those in the cross support 27A are adapted so that if a selected one in each is aligned with a selected one in the other, the cross support may be moved and supported vertically in increments of one-quarter coil width. To this end, a snugly fitting taper pin 24 of suitable nonmagnetic electrically nonconducting material is provided. Once the vertical distance has been chosen by selection of the proper holes on the left hand side of the apparatus, the cross piece 27A is levelled by any suitable levelling means, and a taper pin inserted through one of the horizontal slots 37 disposed three coil widths apart on the right hand end of the cross piece, into the proper hole on the right hand upright to support the cross piece in a truly horizontal position.

To secure the cross piece firmly to the uprights 17 in the selected position, the holes in the third vertically disposed row of holes in each upright are threaded, and screw plugs 23 of nonmagnetic electrically nonconducting or other suitable material are provided to be inserted therein. These screws pass through slots 52 in the cross support 27A, the heads of the screws pressing against the cross support and holding it firmly in place. Fig. 22 shows in cross section the areas of the holes in the upright and the cross-piece, and a pin 24 and screw 23 inserted therein. Similar means is provided for positioning the cross supports 27B and 27C.

Turning now to Figs. 8 and 9 which show respectively a plan view partially broken away and a cross sectional view of the housing 19, there are revealed the coil carriage and the mechanisms for performing the searching operation. The coil carriage 21 has an inlaid nonmagnetic electrically nonconducting block 79 for supporting the search coils 20, fingers 80 fixed to the block by screws 81 holding the coils firmly in the desired positions. The three coils are mounted so that the axis of each is perpendicular to the axes of the other two; and each is adapted to have a voltage induced therein proportional to one of the $H_x$, $H_y$, or $H_z$ components of the electromagnetic field of the solenoids.

Figs. 19 and 20 show details of the coil mountings. Screws 148 hold the inlaid block firmly to the carriage.

Returning to Figs. 8 and 9, the carriage 21 has fixed thereto on its under side a base 96 which has an oval slot 147 therein containing a disc 95 of nonmagnetic electrically nonconducting or other suitable material which is firmly attached to a belt 74 by pin 98, and also by flat headed screw 252 and the shank portion of a nonmagnetic electrically nonconducting roller 250, shown in Fig. 16. The belt ends are joined under the carriage, and the belt runs on the driven pulley 73 which may be made of brass, and the wooden pulley 90, the pulleys being supported by shafts 191 and 91 respectively running transversely across the runway box. Preferably the pulleys are slightly tapered at the ends as shown.

Figs. 8 and 9 in conjunction with Fig. 16 show details of the structure under the carriage. Underneath the belt is a supporting wood structure consisting of a horizontal wooden plate 101 having a longitudinal groove 253 running a substantial portion of its length for free movement of the pin 98, and having transverse supporting ribs 99 and 100, longitudinally extending ribs 215, and bottom piece 104. This rests upon a second base 106 supported by cross ribs 105 resting upon the bottom of the runway box 19B. In addition to the groove 253, the plate 101 has a number of short spaced slots 200 for receiving a plurality of rocker arms, to be subsequently described. A long flat push bar 78, having a yoke member designated generally at 77 attached at one end, is provided beneath plate 101, for reasons to be subsequently apparent.

That the motion of the carriage be rectilinear is of great importance if accurate results are to be obtained. An overhanging lip 126 of the outer box prevents vertical deviations. To prevent horizontal deviations from rectilinear motion, the long true slot 251, Fig. 16, is provided in the wooden surface 101 on which the belt slides. Two nonmagnetic electrically nonconducting rollers, one of which is seen at 250, are mounted with axes vertical on the bottom of disc 95 and engage the slot through holes in the belt. Guideways 118 are also provided on each side of the carriage. The construction as shown permits easy access and removal of the carriage and carriage base as a unit. It is noted in Fig. 8 that near the end of the runway nearest the motor, the overhanging lips 126 are cut away. By running the carriage back almost to the end of travel into this region, it can be lifted free of the belt, the cords 84 and cables 83 having first been removed.

To avoid contact difficulties, it is highly desirable that endless lead wires be provided for the search coils. In the present preferred embodiment, the coil leads run to a series of binding posts 82 placed as shown across the top of the carriage 21. Two-wire flexible conductors 83 run from these to a series of pins 212 running laterally across the carriage base 96, where they are fixedly secured, thence they pass down the runway over the belt and belt pulley 73 as shown returning underneath the lower belt where they are looped around a grooved roller 87 and thence to the clamps 107 fixed by screws 108 into cross piece 110. On the opposite side of the base 96 from the row of pins 212, are two pins 85, having attached thereto cords 84 of cotton or other suitable material which pass over the belt around pulley 90 thence loop around roller 87 and are then around pulley 90 thence loop around roller 87 and are then attached fixedly by pins 86 at the point shown. As the coil carriage moves with the belt, the roller 87 rolls in its groove, the axis of rotation of the roller moving at half the speed of the belt just above it. The wires and cords positioned around the roller in grooves 207 therein may be seen in Fig. 16. Fig. 9 shows hole 111 and longitudinally extending bore 109 in the base piece 104 for taking out the leads to the search coils.

In Figs. 8 and 9, the mechanism for driving the pulley 73 is seen at the right hand portions of the drawings, and comprises a driving motor adapted to have its direction of rotation reversed by reversing its connections in a manner to be subsequently described, and two gear trains adapted to be selectively operated automatically depending upon the direction of rotation of the motor.

Figure 10:
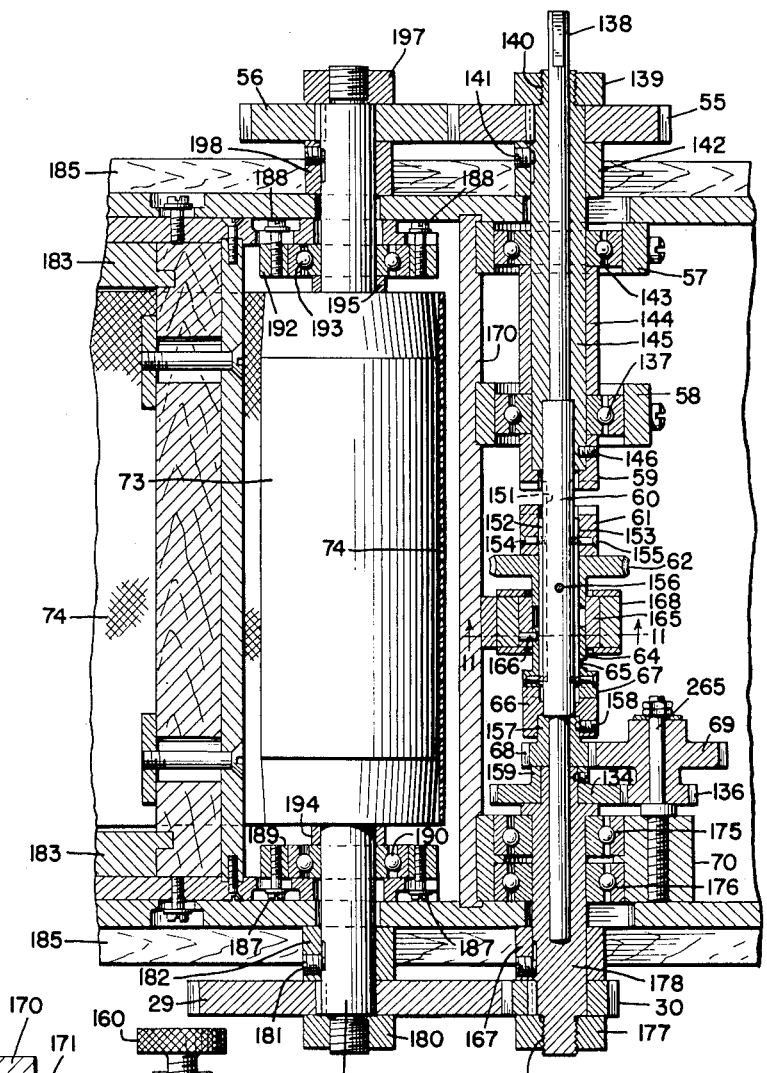
Fig. 10 is an enlarged sectional view taken along the line 10—10 of Fig. 9.

In Fig. 10 these features are revealed in cross section. Pulley 73 is fixed by splines 255 for rotation with the shaft 191 which is journalled for rotation in anti-friction bearings 190 and 193 mounted in housings 189 and 192 respectively, which are adjustable by screws 187 and 188 respectively. Sleeves 194 and 195 hold the pulley in desired lateral position. Keyed to either end of this shaft are spur gears 29 and 56 held in proper position by nuts 180 and 197 respectively. Sleeve 182 fixed on the shaft by set screw 181 spaces the gear 29 properly, and sleeve 198 spaces the gear 56.

Positioned adjacent and parallel to the shaft 191 is the shaft 138 having an enlarged central portion 60. Mounted coaxially with the central portion 60 and adapted to rotate therewith are two sawtooth crown gears 61 and 67 which have their teeth outwardly disposed and which are coupled by two splines 152 and 153 working axially in keyways 151 in the central portion 60. Set screws 154 and 155 hold the gear 61 fixedly to the splines, and similar screws hold gear 67 thereto. Gear 67 has an elongated hub portion 64 having a screw slot 65 therein for a purpose hereinafter to appear.

Adjacent each of the crown gears 61 and 67 is a crown gear 59 and 66 respectively, adapted to mesh therewith selectively depending upon the position of the gears 61 and 67 upon the shaft 60 as subsequently explained.

The gear 59 is fixed by screw 146 to a sleeve 145 disposed around shaft 138 and adapted to rotate freely with respect thereto; the sleeve is journalled for support in anti-friction bearings 137 and 143 in adjustable housings 58 and 57. Keyed upon the outer end of the sleeve 145 and adapted to rotate therewith is a gear 55 meshing with change gear 56, and held in place laterally by sleeve 142 and set screw 141, and by the nut 139 fixed to the threaded end 140 of the sleeve 145. A casing 144 surrounds that portion of the sleeve between the two bearings to maintain them in spaced relation.

The crown gear 66 is fixed by set screw 158 to the hub 157 of a spur gear 68 designed to rotate freely upon shaft 138. Spur gear 68 meshes with gear 69 integral with gear 136 which rotates freely upon a supporting stub shaft 265 mounted parallel and adjacent shaft 138 in a base 70. Gear 136 meshes with gear 134 having hub 159, which is fixed by set screw means to rotate with a sleeve 178 surrounding shaft 138 and free to rotate thereon and extending to form an outboard countershaft. Anti-friction bearings 175 and 176 support the sleeve 178, the bearings being supported within base 70. Bearing supports 57, 58 and 70 may be secured against rotation in any suitable manner. Keyed upon the outer end of sleeve 178 is gear 30 adapted to rotate therewith and held in position by sleeve 179, and nut 177 which is fixed upon the screw-threaded end 179 of the sleeve 178.

Figure 11:
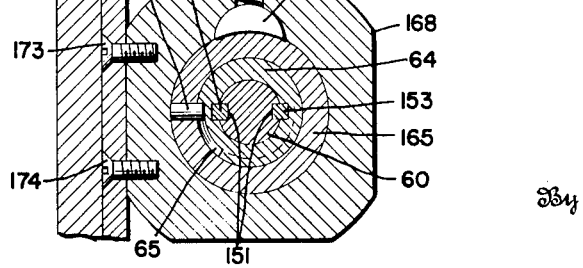
Fig. 11 is a somewhat enlarged sectional view of a portion of the reversing mechanism as viewed along the line 11—11 of Fig. 10.

Mounted upon the shaft of the driving motor 54 is a worm 63 meshing with a worm gear 62 which is fixed by set screw 156 to drive the shaft 60. Adjacent the worm gear is a housing 168 containing the mechanism shown in detail in Fig. 11, including a screw slot 65 in the hub 64 of crown gear 67, into which projects a pin 166 fixed on the inner surface of a sleeve 165 turning with adjustable friction drag in the housing. Friction between the sleeve 165 and the brake or friction member 163 is adjusted by turning screw 160 in its supporting member 161, which controls the tension of spring 162.

It is desirable that the carriage bearing the search coils move relatively slowly on its forward or exploring trip, and rapidly on its return trip. For this reason the outboard change gears on the two sides have different reduction ratios. As shown the gears 30 and 29 impart a speed of rotation to the shaft 191 about one-third of that imparted by gears 55 and 56. Gears 29 and 30 drive the shaft 191 when crown gear 67 meshes with crown gear 66, and gears 55 and 56 drive the shaft 191 in reverse when crown gear 59 meshes with crown gear 61.

The selection of the pair of associated crown gears to be locked together is automatically determined by the direction of rotation of the driving worm wheel. It is recalled that the crown gears 61 and 67 are adapted for movement axially on the shaft 60 and are coupled by splines 152 and 153. For the reason that pin 166 is fixed to the inner surfaces of the sleeve 165 and projects into the screw slot in hub 64, when the driving shaft 138 reverses its direction of rotation, the friction sleeve does not turn until the action of the pin in the screw slot has thrown the crown wheels axially of the shaft into position to drive the sleeve on the opposite side. The housing is attached by screws 173 and 174 to support 171 which is held by screw 172 to the cross support 170.

Means is provided for causing the driving motor to stop and reverse its direction of rotation when the coil carriage approaches the ends of the runway, or if desired when the carriage has travelled a portion of the distance toward either end. Four similar mercury switches 270, 271, 272, and 273, each adapted to alternately close one of two circuits depending upon the position of mercury therein as determined by tilting action thereof, control the direction of rotation of, and are mounted near the motor upon tilting tables such as 127 having adjustable counterweights 122, 123, and 131 and locking nuts 132 therefor, so that a tilting action once initiated by sufficient elongation of springs 115 and 115A will continue past the center. The tilting tables have axles 128 rotating in supporting posts 129 fixed by screws 135 to a base support having vibrations absorbing material 124 thereunder. Clips 125 hold the switches firmly on the tables.

Springs 115 and 115A are connected to adjustable spring supports 113 and 120 fixed to push rod 76 by set screws 112 and 119 respectively. A similar arrangement on the other side of the motor provides for tilting the other switches. The push rod 76 and the oppositely placed push rod 75 are coupled as shown through an aforementioned yoke member 77 having extended yoke arms bored to receive them, to the long flat push bar 78 previously described as disposed beneath the member 101, and which has slots 116 and 117 for receiving rocking lever arms 88 and 89 respectively which are pivoted on shafts 93 and 94 respectively extending transversely through the main framework. As the coil carriage approaches the end of its travel, the pin 98 attached to the disc 95 presses against the rocker arms which then press against the push bar 78 causing it to move along its longitudinal axis. The push rods 75 and 76 attached to yoke 77 and sliding in post supports 92 operate the mercury switches.

Figs. 17 and 18 show the push bar and rocker arms in greater detail. In addition to the end rocker arms 88 and 89, there are shown two additional arms 208 and 210 having shafts 209 and 211 respectively, these additional arms working in grooves similar to those shown at 116 and 117. The two additional arms are located closer to the center of the runway and are provided for shortening the distance of the search coil travel, if desired. The points on its travel where it is wished to stop the coil carriage may be selected by displacing the various rocker arms in a lateral direction so that they are not engaged by the pin 98 as it passes.

Fig. 16 shows the manner in which the rocker arm shafts, for example, shaft 93, are mounted in the frame, rotating in holes in the longitudinally extending supports 215. When it is desired to render rocker arm 88 inoperative, screw plug 206 may be transferred to the hole on the other side of the frame which is adapted to receive it, and turned therein until the shaft 93 moves the arm 88 out of position to be engaged by the pin 98. When it is desired to restore the rocker arm to operative position, the screw plug is placed in the position shown and turned until the rocker arm is moved laterally to the desired position.

Fig. 17 taken in conjunction with Fig. 9 shows the manner in which yoke member 77 is attached to push bar 78. The arms of the yoke are attached by screws 102 to laterally extended arms of a cross piece 97 which is attached by screws 103 to the under side of the push bar 78.

Reference is made now to Fig. 23 which illustrates schematically the electrical circuit of the apparatus. The mercury switches 270, 271, 272, and 273 are shown wired so as to reverse the connections to the motor 54. When the lower ends (as shown in Fig. 23) are tilted down due to the action of the springs and push bars, the motor is connected for movement in the forward direction, and if switch 235 is moved to its "forward" position, the motor will be energized and the carriage will move away from the motor. When the carriage reaches the prescribed end of its travel, the pin 98 will engage a preselected one of the rocker arms, the push bar will move forward, the push rods attached thereto will move forward, and the four mercury switches will tilt forward. The term forward defines a direction away from the motor. The upper ends of the mercury switches as shown in Fig. 23 are those which are disposed forwardly in Figs. 9 and 10. The motor will then be wired for reverse rotation, and if switch 235 is thrown to its "reverse" position, the carriage will move backward until the pin 98 thereunder tilts another preselected one of the rocker arms moving the push-bars backward and the mercury switches are tilted back again. The carriage is thus automatically brought to a full stop before its direction of motion is reversed manually, thereby prohibiting stresses and corresponding strains upon the parts which might ultimately result in slippage or damage.

As has been stated previously, a primary object of the invention is to provide a magnetic field simulating the measured field of a vessel in a selected plane beneath it, and to explore this field with pickup coils each disposed so as to induce a voltage therein proportional to the strength of a predetermined component of the field, and connected individually to recording devices for recording the strength and direction of the field at a large number of points. To this end in the present preferred embodiment 800 solenoids are provided, arranged in a rectangle with their axes parallel, in rows of 40 solenoids and files of 20 each, the ends of all the solenoids lying substantially in the same plane. Whereas Fig. 23 shows one row, for instance, the outside row, it is understood that there are twenty parallel rows each having similar equipment to that of the figure for energizing the solenoids in desired amounts, except that only one transformer is used in the preferred embodiment for supplying power to all of the buses. And whereas Fig. 23 shows only seven solenoids, it is understood that these are selected at various points along the row, and that the total number of solenoids in a row is forty, although all of these forty may not be used in some applications of the apparatus, as will be subsequently explained.

The aforedescribed carriage and driving mechanism therefor are provided for moving search coils longitudinally in a plane below that of the solenoid rectangle. In Fig. 23, recorders $R_x$, $R_y$, and $R_z$ are shown connected with search coils $20x$, $20y$ and $20z$ respectively for recording the magnitude of voltages induced in the search coils. Each recorder is supplied through switch 234 with electrical power for paper driving apparatus. Each recorder is also connected so that a portion of the voltage developed by transformer 231 which supplies the solenoids may also be introduced into the recorder apparatus, if desired, for reasons to be subsequently explained.

The tapped transformer 231 which supplies power to the solenoid is preferably designed to have excellent regulation, and has its center tap grounded, as shown. In the present embodiment, the transformer has a full secondary voltage of 60 volts, and has a tap every 0.3 volt each side of center. This number of taps permits selection of any voltage in either phase or polarity with reference to the grounded center tap and from 1 percent of full voltage to full voltage, in 1 percent steps. Each tap is connected through cables 244 to a series of bus bars 237A, 237B, etc., to which each solenoid may be individually and selectively connected for energization in a manner to be subsequently described. The transformer 231 is supplied with constant E. M. F. from a generator 232 driven by motor 233. In the present preferred embodiment a generator frequency of 270 cycles per second was chosen because it does not correspond to any of the usual harmonics or fundamental frequencies likely to be encountered from power supplies. The ends of the solenoids nearest the search coils are all at ground potential.

Extensive switching devices provide a systematic means for connecting every one of the 800 live ends of the soleniods to any one of the 201 buses 237A, 237B, etc. energized from the transformer. In the present preferred embodiment, forty switching panels are provided. Each panel contains 201 buses horizontally disposed, and twenty vertically disposed selector rods 245. Associated with each rod is a sliding contact mechanism, indicated by the numerals 238A, 238B for electrically connecting a solenoid to each rod, and each rod carries fixed thereto a contact mechanism 239A, 239B, etc. for making electrical contact with a selected bus, depending upon the vertical displacement of the selector rod. Any suitable design of buses and contact mechanisms may be used. In the present embodiment of the invention, in general the buses and contact mechanisms associated therewith follow the design of standard telephone equipment. A large number of horizontal, perforated metal strips are separated by compound impregnated paper insulating strips, the whole being compressed in a metal frame by tie bolts passing through some of the perforations. The punched metal strips are provided with tongues that project laterally on both sides, the tips of the tongues being silver plated. These tongues project beyond the insulating paper, and in the assembled panel, form rows of contacts along which double contact fingers carried by the selector rods can slide. The contact fingers may resemble those used in telephone equipment, and in the present embodiment are fixed to closely fitting metal sleeves which slide upon fixed rods disposed adjacent and parallel the movable selector rods. The fixed rods are individually connected electrically to the solenoids. The sliding sleeves are moved by the selector rods, but are electrically insulated therefrom.

Disposed beneath the rows of buses on each panel are rows of catch members 242, numerically designated and adapted to cooperate with suitable members 243 fixed to the selector rods 245. These are provided to insure that when the elevator selector rods are set, the conductive contact fingers will alway stop on a bus tongue and never bridge between two tongues. Any suitable design may be employed; in the subject embodiment a rack resembling standard telephone equipment is provided which consists of a strip of hard alloy copper punched with slots at spaced intervals. A cooperating carriage fixed to the elevator rod has two pawls, one of which engages a slot while the other is half way between slots. Numbers are provided stamped on the rack in relation to the slots so that numerical as well as graphical settings of the elevator selector rods can be made. Releasable spring means may be provided for changing the contact carriage position on the elevator rods.

As stated previously, a curve showing the variation of the ship's magnetic field along a straight line parallel to the keel is called the ship's magnetic signature. Such a signature is shown at 240 in Fig. 23, the curve 241 indicating the sign and amplitude of the vertical component of the field. The signature chart 240 may be formed in any manner, and the curve 241 thereon can be produced or prepared by any suitable means. In the present embodiment forty switching panels are provided, each panel controlling a half row of 20 solenoids. Each switching panel has provision for mounting a graph similar to 241 disposed beneath the buses and catches as shown in Fig. 23, and related as shown to the lower extremities of the selector rods, positioned so that if the end of the rod rests on the zero line of the chart, the contact mechanism 239 attached thereto will rest upon the bus of zero potential. The spaces between the buses on either side of the bus of zero potential are of uniform distance, and the increases in the potentials on the buses as they lie farther from the bus of zero potential are uniform, in the present embodiment 0.3 volt per bus, so that the solenoids will be energized in varying amounts directly proportional to the distance of the solenoids' connecting means 239 from the zero potential bus, and since the contacts 239 are fixed to the selector rods, the solenoids will be energized in varying amounts directly proportional to the distance of the ends of the selector rods from the zero axis of the chart 240. As stated previously, it is sufficient for the purposes of the invention that the intensities in the simulating field be proportional to those in the vessel's field; absolute values are not important. Hence it is possible to adjust the relative energization of the solenoids which create the simulating field by moving the ends of the selector rods correct proportional distances from the zero axis of the chart 240, it being assumed that the y coordinate of the chart is linear. If desired, the distance from the zero bus bar to the bar at greatest potential may correspond to the distance between the zero axis and maximum (or 100 percent) on the y coordinate of the chart 240, although such an exact scale is not necessary. The horizontal or X coordinate of the signature 241 may be drawn to a scale determined by the distance between the two outer selector rods of a panel. This distance may represent full scale or 100 percent of the X coordinate of the signature 241, or 50 percent. As stated previously, in the present embodiment, two switching panels are employed for each row of 40 solenoids. When the signature is that of a relatively short ship, only half of the row may be used, the remaining half being un-energized.

In setting up the equipment to simulate a ship's magnetic field, a number of signatures of the vertical component of the ship's field, taken at spaced athwartship intervals in a given plane running horizontally under the ship, are used to simultaneously determine the energization of a number of rows of solenoids, preferably a corresponding number, in the subject field duplicating device. The total electric field under the bank of solenoids may then be relied upon to duplicate to a high degree of accuracy the field under the ship, being substantially of the same sign and amplitude at any point, since it can be shown mathematically that if the distribution of the vertical component of the magnetic field intensity of a ship is completely known all over a horizontal plane at any particular depth below the keel, the field of the ship anywhere below this plane is uniquely determined. The search coils are then caused to move in the simulating electro-magnetic field in a series of straight lines disposed so as to lie parallel to the axis of the keel of the ship, as determined by the signature-controlled energization of the solenoids. By choosing the distance between the ends of the solenoids and the plane in which the search coils move, the results recorded by $R_x$, $R_y$, and $R_z$ will represent ship's signatures of all components of the field taken at a designated distance beneath the ship.

The distance of the horizontal plane in which the search coil must move, below the ends of the solenoids, in order to secure a signature at a wanted depth below the depth of measurement, is automatically fixed by the distance between the signatures taken in the plane of measurement. For example, assume that the measured signatures were taken by a row of coils placed 20 feet apart in a horizontal plane under the vessel. In the present preferred embodiment, the width of a solenoid coil, and hence the spacing between centers of adjacent signatures in the coil box, is 0.4615 inch. Hence, in the model field set up by the solenoids, 0.4615 inch equals 20 feet. The geometric scale ratio thus adopted between the dimensions of the ship's field and the dimensions of the model field must be identical for all three of the $x$, $y$, and $z$ coordinates; this is a consequence of the interrelatedness of the rates of variation of the magnetic intensity along the three coordinates in accordance with the fundamental law of electromagnetism. So that, in the example chosen, if it were desired to secure a signature at a distance of say 100 feet below the measured plane, the search coil would be made to traverse the model field in a plane 5×0.4615 or 2.3075 inches below the plane in which the solenoid windings ended. As the measured plane is usually at some depth in the water, this distance must be added to secure the depth of the new signature below the surface.

In the present embodiment of the invention, the vertical component of the simulating field is referred to as the $z$ component. The X coordinate refers to measurements fore and aft (direction of exploration), and the $y$ coordinate refers to measurements athwartship. To facilitate setting up useful geometric ratios, the scale 261 employed for setting the transverse position of the coil carriage runway box 19 is made in units of length corresponding to a solenoid coil width. As stated previously, the bores or holes 39 shown in the uprights 17 in Fig. 2 are so spaced that the cross supports 27 can be moved and supported vertically in increments of one coil width or fractional portions thereof.

Reference is made now to Fig. 24 which shows a simplified diagram, partially schematic, of suitable apparatus used to record the output of any one of the search coils in the form of a magnetic signature of any one of three components of the model field. Substantially identical recorders are designated generally in Fig. 23 as Rx, Ry, and Rz. Whereas other types of recorders may be used, the recorder illustrated in Fig. 24 represents a preferred apparatus having advantages which will be apparent. It is an A. C. potentiometer bridge recorder in which rectilinear motion of the pen across the moving chart-paper is produced by two small D.-C. servo-motors shown at 281 and 282, having field windings 283 and 284 respectively. The pen carriage 277 is moved by a fish-line belt 288 which runs on pulley 289 and which wraps around the pulley 290 on the motor shaft. The pen carriage carries a contact finger 287 which wipes over the rheostat or balancing slide wire 276 as the position of the pen is displaced. This rheostat is supplied through shielded transformer 280 with a 270 cycle per second A.-C. voltage of appropriate phase to correspond with the phase of the E. M. F. generated in the search coil. Transformer 280, in turn, is supplied through a variable phase shift network by way of conductors $p$ and $q$ to the secondary of transformer 231. The potential difference developed between the center of the rheostat 276 and the point of contact of the sliding finger 287, as the finger is displaced from the zero potential point on the rheostat, is placed in series with the output of the search coil; and the algebraic sum of these two is applied through transformer 279 to the grid of the first tube of an amplifier, of conventional design and shown in block form, as will appear more fully hereinafter. The output of the amplifier is fed to a control circuit for a pair of thyratrons 297 and 298 which control the operation of the pair of servo-motors 281 and 282 which drive the pulley shaft in opposite directions. Each motor runs when the one of the gas tubes individual thereto is fired and continues to run as long as the tube conducts. In the thyratron control circuit, the output of the amplifier is fed through transformer 293 in phase opposition to the control grids of a pair of rectifier tubes 291 and 292, while a voltage of the same frequency and appropriate phase relation is applied to the rectifier tubes in phase synchronization through transformer 294. The two transformer voltages are thus applied in phase addition to one rectifier tube, and in phase opposition or cancellation to the other. Bias is supplied the rectifiers by cathode bias resistor 295.

The manner in which the rectifiers control the thyratrons is substantially as follows: With no signal into transformer 293 and normal input to transformer 294, the screen grid voltages on rectifiers 291 and 292 are balanced by potentiometer 296 so that their plate currents are substantially equal, as may be shown by any suitable indicating means. The plate circuit of tube 291 includes potentiometer 201 in series with resistance 203. The plate circuit of tube 292 includes potentiometer 202 in series with resistance 204. The components or circuit elements associated with tube 291 may be of substantially similar resistance values to the corresponding components of the circuit of tube 292, and tube 291 may be substantially identical with tube 292.

The grid circuit of thyratron 297 is traced as follows: from the control grid of thyratron 297 by way of current limiting resistance 213 which may be of the order of one megohm, potentiometer 201, resistance 203, resistance 204, potentiometer 202, the armature of motor 281, and resistance 247 connected to the cathode of thyratron 297. The plate circuit of tube 297 includes the secondary of transformer 299, the armature of motor 281, and resistance 247.

The grid circuit of thyratron 298 is traced from the control grid thereof by way of current limiting resistor 214, potentiometer 202, resistors 204 and 203, potentiometer 201, armature of motor 282, and thence by way of resistor 248 to the cathode of thyratron 298. The plate circuit of tube 298 includes the secondary of transformer 300, armature of motor 282, and resistance 248.

Voltages developed across resistances 201 and 203 due to plate current flowing in tube 291 tend to make the grid of tube 297 negative with respect to cathode, while voltages developed across resistances 202 and 204 due to plate current flowing in tube 292 tend to make the grid of tube 297 positive with respect to cathode. By adjusting the taps and potentiometer arms suitably, a condition may be obtained whereby, when the rectifier plate currents are equal, the voltage on the grid of tube 297 is such that the tube is not fired. An increase in the plate current of tube 292 and corresponding decrease in the plate current of tube 291 due to phase cancellation of voltages in the rectifier input circuits when transformer 293 is excited from the amplifier will cause the grid voltage of thyratron 297 to be changed in a positive direction sufficient to ignite the tube, energizing the motor 281 to move the arm 287 on the slide wire 276.

If tube 297 is fired as a result of unbalance of voltages in the amplifier input circuit, motion on the slide wire 276 will be in a direction to restore balance. A substantially similar circuit results in firing tube 298 and energizing motor 282 when the conditions of unbalance are reversed. It is evident, then, that any unbalance results in motion of the pen carriage until a new balance is established by moving the sliding contact finger to the appropriate position on the rheostat. An unbalance in one direction on the slide wire will result in voltages in phase addition in the input circuit of one rectifier of the pair 291, 292; an unbalance in the other direction on the slide wire will place the voltages in phase addition on the other rectifier. The slide wire will balance on either side of its zero potential point, depending upon the phase relation of the voltage induced in the search coil to the phase of the voltage in the slide wire. The position of the pen carriage thus indicates both the phase and magnitude of the E. M. F. output of the pick-up coil.

Alternating plate potentials on the thyratrons from the secondaries of transformers 299 and 300 provide extinguishing means therefor, the primaries of these transformers being supplied from the A.-C. source for the power supply. Any suitable means may be provided for supplying filament potential to the various tubes.

Various calibrated attenuators and level indicators (not shown) of conventional design are provided for correct calibration of the equipment. A pre-amplifier may be used to amplify the output of the search coil before applying it to the balancing slide wire. Variable resistance controls are shown at 285 and 286 for zero adjustment and scale adjustment respectively. Proper phase relation between the induced E. M. F. in the search coil and that supplied by transformer 280 may be secured by adjusting the variable phase shift network of conventional design shown in block outline, and if necessary, by adjusting the slide wire (with the motors turned off) until the output of the amplifier is minimum, as observed by suitable indicating means (not shown) such as a vacuum tube voltmeter. Phase shifts taking place in the amplifier are known from the design features thereof.

It will be understood by those skilled in the art to which the invention pertains that calculations of field strength, induced voltage, etc. may be readily made permitting the amplitude of the recorded E. M. F. to be interpreted in gauss, and the actual magnitude of the vessel's field in the desired plane below the plane of measurement thus determined. It is further understood that the rate at which paper runs in the recorder may be readily related to the distance between vertical selector rods and the speed at which the search carriage moves, permitting accurate ratios to determine fore and aft distances on the signatures obtained from the recorders Rx, Ry, and Rz.

Referring again to Fig. 1, it is seen that at one end of the carriage box 19 is attached a switch box 28, for the convenience of the operator who will stand at this end. An elevation of the box is revealed in Fig. 21, showing the switches 234 for controlling the movement of paper in the recorders, the motor reversing switch 235, and the main power switch 236.

In the preferred embodiment of the invention under consideration the carriage box 19 is so designed that the belt and pulleys together with the driving mechanism form a separate structure which can be drawn out of the long box. To accomplish this it is necessary to pull on the brass cross-partition 170 of the drive mechanism while exerting a reaction on the outer wooden box structure, having removed beforehand the nonmagnetic electrically nonconducting screw plugs 206 which control the limit mechanism. The inner wooden framework comprising frame members 101, 103, and 104 thereafter may be removed from the side walls 185.

While the invention has been described with reference to a certain preferred example thereof which gives satisfactory results, it will be understood by those skilled in the art to which the invention pertains, after understanding the invention, that various changes and modifications may be made without departing from the spirit and scope of the invention, and it is my intention, therefore, in the appended claims to cover all such changes and modifications.

The invention herein described may be manufactured and used by or for the Government of the United States of America for governmental purposes without the payment of any royalties thereon or therefor.

What is claimed as new and desired to be secured by Letters Patent of the United States is:

1. In an extrapolator of the character disclosed, the combination of means for setting up a plurality of alternating current fields along a first predetermined plane which simulates the field of a vessel as measured within a horizontal plane beneath the keel thereof, a pick-up coil, means for causing the pick-up coil to traverse selectively any one of a plurality of parallel paths in any one of a plurality of transverse planes within the A.-C. fields and parallel to said first predetermined plane, said pick-up coil being so oriented on said traversing means as to generate a voltage variably in accordance with variations in the strength of a predetermined component of the A.-C. field as the coil moves to different positions with respect thereto, and means controlled by said voltage for producing traces of variations in said component as the pick-up coil traverses said paths respectively.

2. Field extrapolating apparatus for obtaining the magnetic signature of a vessel comprising, in combination, an assembly of substantially similar electro-magnets disposed in parallel rows, the electro-magnets in each row having their axes parallel and normal to the row itself, one end of each of the electro-magnets lying in the same plane, means for individually and selectively energizing the magnets in each row with an alternating current in accordance with the measured values of one of a plurality of magnetic signatures of a vessel taken in a horizontal plane of measurement beneath it, the total field set up by the simultaneous energization of the electro-magnets of several rows being substantially similar to the field of the vessel in the plane of measurement thereof, a search coil for traversing said total field and having its axis disposed with respect thereto whereby a voltage is induced therein proportional to one of the components of the total field, means for moving said coil in said total field in a predetermined path whereby the voltage induced therein is proportional to the strength of the magnetic field of the vessel in a plane a predetermined distance below said horizontal plane of measurement, and means for recording the voltage induced in said coil in the form of a magnetic signature.

3. Field extrapolating apparatus for obtaining the magnetic signature of a vessel comprising, in combination, an assembly of substantially identical solenoids arranged substantially in a rectangle of parallel rows and parallel files, one end of each of said solenoids lying in a plane substantially normal to the axes of said solenoids, means for individually energizing all of said solenoids simultaneously with an alternating current in predetermined amounts to create a total field in a plane at right angles to said axes and simulating the field of a vessel in a horizontal measuring plane beneath it, the solenoids in adjacent rows being energized in accordance with the measured sign and amplitude of the vertical component of the field of said vessel taken in a first group of adjacent parallel lines lying within said horizontal measuring plane substantially parallel to the keel whereby the solenoids in adjacent files are energized in accordance with the sign and amplitude of the vertical component of the field of said vessel in a second group of adjacent parallel lines normal to the axis of the keel and lying substantially in said horizontal measuring plane, means for measuring the strength of said simulated field at selected points in a plane parallel to said first named plane, and means operatively connected to said measuring means for recording the sign and amplitude of the fields measured to provide a record trace indicative of a magnetic signature of said vessel.

4. Field extrapolating apparatus comprising, in combination, a plurality of substantially identical electromagnets, means for supporting said electro-magnets in mutually parallel abutting relation, means for simultaneously energizing said electro-magnets individually in predetermined amounts to create an alternating electro-magnetic field simulating the magnetic field of a vessel measured in a horizontal plane beneath the keel thereof, a plurality of search coils adapted to move within said electro-magnetic field and to have a voltage respectively induced therein proportional to a different one of the components of said electro-magnetic field, means for moving all of said search coils simultaneously in a substantially straight line in a selected transverse plane in said electro-magnetic field, and a plurality of recording means adapted to record the sign and magnitude of voltages induced in individual ones of said search coils.

5. Field extrapolating apparatus for obtaining the magnetic signature of a vessel comprising, in combination, a plurality of closely disposed substantially identical solenoids, means for individually and selectively energizing said solenoids with an alternating current simultaneously in predetermined amounts to create an electro-magnetic field simulating the measured magnetic field of the vessel along a predetermined plane, means including a search coil for measuring the strength of said electro-magnetic field at selected positions, recording means controlled from said search coil for producing a record trace indicative of a magnetic signature of the vessel, and means for moving said search coil in said electro-magnetic field selectively in any one of a plurality of parallel paths in any one of a plurality of transverse planes, said last named means including a carriage for said coil and a supporting runway adapted to guide said carriage in a substantially straight line as it moves in said electro-magnetic field.

6. Field extrapolating apparatus for obtaining the magnetic signature of a vessel at a desired depth below the depth at which magnetic measurements have been taken comprising, in combination, an assembly of a number of parallel rows of substantially identical solenoids, the solenoids in each row having their axes parallel and running transverse to the row itself, one end of each of said solenoids lying in the same plane, means for individually and selectively energizing the solenoids in each row with an alternating current in accordance with the measured values of one of a plurality of signatures of a vessel taken in a horizontal measuring plane beneath it, the total field set up by the energization of several rows being substantially similar to the field of the vessel in said measuring plane, a search coil for traversing said field and having its axis disposed with respect thereto so that a voltage is induced therein proportional to one of the components of said total field, recording means connected to said coil for recording said induced voltage, means for moving said coil in said total field whereby the induced voltage recorded therefrom represents the magnetic signature of the vessel at said desired depth, said last mentioned means comprising a carriage for said coil, transporting means for moving said carriage across said total field in a substantially straight line at substantially constant speed, and means for precisely positioning said transporting means in three dimensions with respect to said total field.

7. In magnetic field extrapolating apparatus, in combination, a plurality of substantially identical solenoids, means for separately and individually energizing said solenoids with an alternating current for generating an electro-magnetic field simulating in reduced scale the magnetic field of a vessel measured in a horizontal measuring plane beneath the keel thereof, a search coil adapted for movement within said electro-magnetic field and so disposed with relation thereto as to have a voltage induced therein proportional to a predetermined one of the components of said electro-magnetic field, recording means operatively connected to said search coil for recording the sign and magnitude of voltages induced therein in the form of a magnetic signature of the vessel, means for moving said coil, and means for precisely locating said moving means in three dimensions in said electro-magnetic field whereby the recorded output of said recording means as the search coil moves in a line in said simulated field represents a signature of the vessel at a desired depth below said horizontal measuring plane, said locating means comprising a plurality of substantially vertical stanchions disposed in proximity to said solenoids and having vertically disposed rows of holes therein, the distance between centers of adjacent holes in each row being measured in units of the width of one of said solenoids, a plurality of cross supports for supporting said moving means and adapted to be held in cooperative relation with said stanchions and having horizontally disposed rows of holes therein, the rows of holes in said cross supports being spaced horizontally in units of the width of a solenoid, the holes in said cross supports being adapted to register with the holes in said stanchions whereby the proper scale between the magnetic field of the vessel and the electro-magnetic field may be readily maintained in the recorded output of said recording means.

8. Field extrapolating apparatus for obtaining the magnetic signature of a vessel comprising, in combination, an assembly of substantially identical electro-magnets disposed in parallel rows with the axes of all of said magnets parallel and one end of each of the magnets lying substantially in a plane normal to said axes, means for individually and selectively energizing the magnets with an alternating current in each row in accordance with the measured sign and amplitude of the vertical component of the vessel's magnetic field taken in a line beneath the vessel, said line being substantially horizontal and parallel to the keel, adjacent rows of said electro-magnets being energized in accordance with the measured vertical components of the vessel's magnetic field measured on adjacent parallel lines in the same horizontal plane beneath the vessel, the total field set up by the energization of several row of electro-magnets being substantially similar to the field of the vessel in the horizontal plane of the lines of measurement, at least one search coil arranged for reciprocatory movement within said total field selectively in a plurality of parallel paths for inducing a voltage therein proportional to a predetermined one of the components of said total field, recording means associated with said coil for recording the sign and amplitude of voltages induced in the coil, and means for imparting a slow forward searching movement and a rapid return movement to said coil, said last named means comprising a coil carriage, a belt for moving said carriage, a driving pulley for said belt, a driving shaft for said pulley, a pair of gear trains alternatively effective for turning said shaft in opposite directions, a driving motor, and a plurality of gears associated with said motor, said gears being selectively operated in accordance with the direction of rotation of said motor for supplying motive power to selected ones of said pair of gear trains.

9. In searching apparatus, at least one search coil and recording means associated therewith, a coil carriage, a belt for moving said carriage, a pair of pulleys for said belt, and means for connecting said coil electrically with said recording means and adapted to be mechanically unbroken by the movement of said carriage, said last named means comprising a grooved roller disposed beneath said belt and adapted to roll in either direction parallel to the line of travel of said belt, flexible lead wire means for said coil attached to one side of said carriage and passing around one of said pulleys over said belt then looping around said roller and thence to a fixed position, and flexible cord means attached to the opposite side of said carriage and passing around the other of said pulleys over said belt then looping around said roller and thence to a fixed position, said cord means and roller preventing slack in said lead wire means as the carriage moves.

10. Field extrapolating apparatus for obtaining the magnetic signature of a vessel comprising, in combination, a plurality of substantially identical solenoids adapted to be simultaneously and individually energized in predetermined amounts to generate an electro-magnetic field simulating in sign and magnitude the magnetic field of the vessel measured in a horizontal measuring plane beneath the keel thereof, the said solenoids being arranged in a substantially rectangular assembly of parallel rows and parallel files, one end of each of said solenoids lying in a plane normal to the axes, and a plurality of substantially similar switching means for energizing the rows of solenoids in desired amounts, each of said switching means comprising a plurality of voltage sources of graduated potentials, a plurality of movable selector rods adapted to have mounted in juxtaposition to the ends thereof a chart of the magnetic signature of the vessel taken in said measuring plane, and contact means carried by each of said selector rods for connecting one solenoid to one of said voltage sources depending upon the instant setting of said selector rods, all the solenoids in a row being energized in desired amounts by moving said selector rods so that the ends thereof coincide with the trace on said chart.

11. Field extrapolating apparatus comprising, in combination, a plurality of electro-magnets arranged in parallel rows and adapted to be individually energized in predetermined amounts, a transformer having a plurality of taps, a plurality of substantially parallel buses energized at different graduated potentials from said transformer, the middle one of said buses being connected to the center tap of said transformer and to one end of all of said electro-magnets, a plurality of settable selector rods disposed substantially parallel to each other and substantially perpendicular to said buses, the lower ends of all of said selector rods extending considerably below said buses and adapted to have mounted in juxtaposition thereto a chart of the magnetic signature of a vessel, the said chart having its zero axis disposed normal to the lines of movement of said selector rods, a plurality of connecting means respectively carried by said selector rods for making electrical connections with selected ones of said buses in accordance with the instant settings of the selector rods, the said connecting means being fixed at positions on said selector rods whereby when the end of a selector rod coincides with the zero axis of said chart the connecting means carried thereby will fall on the bus of zero potential and when the end of a selector rod falls on either side of the zero axis of said chart the connecting means attached thereto will fall upon a bus energized in potential proportional to the distance of the end of said selector rod from said zero axis of said chart, and means for electrically connecting said connecting means individually to the other ends of said electro-magnets whereby the energizations of the electro-magnets in each of the said rows are controlled in desired amounts by adjusting said selector rods so that the ends thereof coincide with the curve on said magnetic signature chart.

12. In field extrapolating apparatus, means for generating a magnetic field, means including at least one search coil for measuring the strength of said magnetic field at selected points therein, means for imparting reciprocatory movement to said coil within said field, said last named means comprising a carriage for said coil, a belt for moving said carriage, and having an actuating element secured thereto under said carriage, a reversible electric motor for driving said belt, a plurality of switches controlling the direction of rotation of said motor, a push bar disposed beneath said coil carriage, means operated by said actuating element in response to the movement of said coil carriage for causing movement of said push bar when the carriage reaches either one of a pair of predetermined positions, and coupling means connecting said push bar with said plurality of switches for reversing the connections to said motor when said switches are operated upon movement of said push bar as the carriage moves through either of said predetermined positions.

13. Apparatus according to claim 12 wherein said plurality of switches are additionally characterized as each containing mercury and a pair of contacts adapted to be selectively closed and opened alternately upon the tilting of said switch toward either end, and including in addition tiltable supports for mounting said switches.

14. Apparatus according to claim 12 comprising in addition switch means operable at will for starting said motor.

15. In field extrapolating apparatus employing a movable search coil, a plurality of closely spaced electro-magnets, means for supporting said electro-magnets in desired operative relationship to said coil, said supporting means also comprising a housing for all of said electro-magnets and having a pair of lips protruding from opposite ends of the upper portion thereof, a framework for supporting said housing and having internally disposed shoulders for engaging the lips thereby to support the housing, means for clamping together groups of said electro-magnets to form files thereof, means for suspending each of said files of magnets loosely from the upper portion of said housing, said suspension means comprising shoulder pieces attached to said files and adapted to rest upon the upper edges of the walls of said housing, and means for clamping the electro-magnets and housing within the framework.

16. Apparatus according to claim 15 wherein said electro-magnets are additionally characterized as having cores and ventilating ducts extending the length of each core, and comprising, in addition, means for directing a flow of air through said ventilating ducts when said electro-magnets are clamped in said housing and said frame.

17. The method of securing the magnetic signature of a vessel at a desired second depth below an initial depth at which magnetic measurements have been taken, which comprises, generating a total electro-magnetic field simulating in sign and amplitude the measured magnetic field of the vessel taken in a horizontal measuring plane beneath the keel thereof at said initial depth, said total field being obtained by setting up a plurality of adjacent fields each directly determined by a signature of the vessel taken in adjacent parallel lines in said measuring plane, and determining the strength and sign of said total electro-magnetic field at points having definite geometrical relationships therein, the magnitude of points measured in said total field corresponding proportionally to those of points in the magnetic field of said vessel in a plane at said second desired depth.

18. The method of securing the magnetic signature of a vessel at a desired depth below an initial depth at which a first magnetic signature has been taken which comprises the steps of, producing on a reduced scale a composite alternating current electro-magnetic field having at a reference plane therein a sign and amplitude proportional to the sign and amplitude at each of a plurality of points in a line taken along the length of the vessel and in a first horizontal plane therebeneath to simulate the magnetic signature of the vessel along said line, and measuring and recording the sign and amplitude of the electro-magnetic field at a plurality of points along a line in a plane parallel to the reference plane and corresponding to said desired depth.

19. The method of securing the magnetic signature of a vessel at a desired depth below the vessel which comprises simulating the sign and amplitude of the magnetic field of the vessel as measured in a plurality of points in a horizontal plane at a predetermined depth below the vessel, and measuring the sign and amplitude of said simulated field at a plurality of points in a selected plane therein corresponding to said desired depth.

20. The method of determining the magnetic signature of a vessel at a selected plane corresponding to a predetermined depth beneath the vessel which comprises the steps of simulating in sign and amplitude a magnetic field corresponding to the magnetic field of the vessel, and measuring the sign and amplitude of said simulated field at a plurality of points in a plane within the simulated field corresponding to said selected plane.

21. The method of recording the magnetic signature of a vessel at a selected depth different from the depth at which a magnetic signature of the vessel has been measured which comprises generating a simulated electromagnetic field corresponding in sign and amplitude to the measured signature of the vessel, measuring the amplitude and sign of the simulated field at a plurality of points therein representative of points in the vessel's magnetic field in a plane corresponding to said selected depth, and recording the measurements of the simulated field at each of said points.

22. The method of securing the signature of a vessel at a predetermined depth below an initial depth at which a first signature of the vessel has been taken which comprises the steps of generating a composite alternating current magnetic field to simulate in reduced scale the signature of the vessel at said initial depth when measured in a first plane in said generated field, and measuring said generated field at a plurality of points therein in a second plane spaced in parallel relation from said first plane a distance proportional to the difference in said initial and predetermined depths.

23. Field extrapolating apparatus comprising, in combination, means for generating a plurality of alternating current electro-magnetic fields at a plurality of predetermined points respectively in a predetermined plane whereby the combined electro-magnetic fields simulate the magnetic field of a vessel measured in a first horizontal plane throughout the length and beneath the keel thereof, means for measuring the strength of the combined fields at a plurality of points in a selected plane parallel to said first plane, and means operatively connected to said measuring means for recording the sign and amplitude of said field strengths thereby to simulate the magnetic field of said vessel in a second horizontal plane thereof and corresponding to said selected plane.

24. Field extrapolating apparatus comprising, in combination, means for generating at a plurality of points in a predetermined plane a composite alternating current electro-magnetic field having a predetermined sign and amplitude and simulating the magnetic field of a vessel as measured in a horizontal plane beneath the keel and along the length thereof, means for measuring the strength of said field at a plurality of points in a selected plane therein parallel to said predetermined plane, and means operatively connected to said measuring means for recording the sign and amplitude of the field measured in said selected plane thereby to simulate the magnetic signature of said vessel in a second horizontal plane beneath the vessel corresponding to said selected plane and spaced from the first horizontal plane by a distance proportional to the distance between said predetermined and selected planes.

References Cited in the file of this patent

UNITED STATES PATENTS

| | | |
|---|---|---|
| 2,220,788 | Lohman | Nov. 5, 1940 |
| 2,388,683 | Frickey et al. | Nov. 13, 1945 |